United States Patent
Tam

(10) Patent No.: US 9,186,702 B2
(45) Date of Patent: Nov. 17, 2015

(54) CONTROLLING VIBRATIONS FROM MULTIPLE VIBRATOR MOTORS IN A MOBILE COMMUNICATIONS DEVICE

(71) Applicant: Apple Inc., Cupertino, CA (US)

(72) Inventor: Ching-Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 13/687,949

(22) Filed: Nov. 28, 2012

(65) Prior Publication Data

US 2014/0148217 A1    May 29, 2014

(51) Int. Cl.
*H04M 1/00*  (2006.01)
*B06B 1/02*  (2006.01)
*H04M 19/04*  (2006.01)
*B06B 1/16*  (2006.01)

(52) U.S. Cl.
CPC ........... *B06B 1/0261* (2013.01); *H04M 19/047* (2013.01); *B06B 1/161* (2013.01); *H04M 2250/12* (2013.01)

(58) Field of Classification Search
CPC . H04M 19/047; H04M 2250/12; B06B 1/161
USPC ....................... 455/556.1; 318/114
See application file for complete search history.

(56) References Cited

U.S. PATENT DOCUMENTS

| 7,906,920 | B2 | 3/2011 | Imagawa |
| 8,000,839 | B2 | 8/2011 | Urmanov et al. |
| 8,384,316 | B2* | 2/2013 | Houston et al. ............... 318/114 |
| 2006/0061455 | A1 | 3/2006 | Nousiainen |
| 2009/0072768 | A1 | 3/2009 | Murray et al. |
| 2010/0295678 | A1 | 11/2010 | Suzuki et al. |
| 2011/0025480 | A1 | 2/2011 | Hwang et al. |
| 2011/0301870 | A1 | 12/2011 | Tam et al. |
| 2013/0043987 | A1* | 2/2013 | Kasama et al. ............ 340/407.1 |

* cited by examiner

*Primary Examiner* — Wayne Cai
(74) *Attorney, Agent, or Firm* — Blakely, Sokoloff, Taylor & Zafman LLP

(57) ABSTRACT

A mobile device that includes a motion sensor, multiple vibrators, and a motor speed determinator module. The motion sensor senses and records vibrations of the mobile device while the multiple vibrators are simultaneously running. The sensed vibrations are transmitted to the motor speed determinator module, which transfers the sensed vibrations into the frequency domain. The vibrations caused by each of the multiple vibrators are represented by peaks in the frequency representation. In one embodiment, the motor speed determinator module drives each vibrator such that the rotational speed and phase of each vibrator are equal or essentially equal. This is represented in the spectral representation of the frequency domain as the overlapping of each peak into a single peak.

15 Claims, 4 Drawing Sheets

CONTROLLING VIBRATIONS FROM MULTIPLE VIBRATOR MOTORS IN A MOBILE COMMUNICATIONS DEVICE

FIELD

An embodiment relates to a mobile communications device that has two or more vibrator motors and techniques for synchronizing the vibrations caused by the vibrator motors. Other embodiments are also described.

BACKGROUND

Mobile phones generally use vibration as a means for informing the user of incoming calls. The silent alert provided by vibration is helpful in instances where an alerting sound is inappropriate, or where an alerting sound is inadequate. Thus, tactile sensation is used to notify the mobile user of calls or other events, such as alarms, calendar reminders, etc.

Many mobile phones use two or more eccentric mass vibrator motors to produce a greater vibration or produce haptic effects for silent alerts. Eccentric mass vibrator motors are typically driven at a single direct current (DC) voltage to produce a sustained vibration. Internal variation in each vibrator motor may cause one motor to rotate at a different speed and rotational phase relative to another vibrator motor that is also embedded in the same mobile phone, even when driven by identical voltages. Vibrator motors that are driven at different speeds and phases may interfere or partially cancel out each other's vibrations. The net effect of their vibrations may result in a dampened or reduced vibration for the entire device. Thus, a system and technique is needed to maximize the vibrations from multiple vibrators in a single device.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
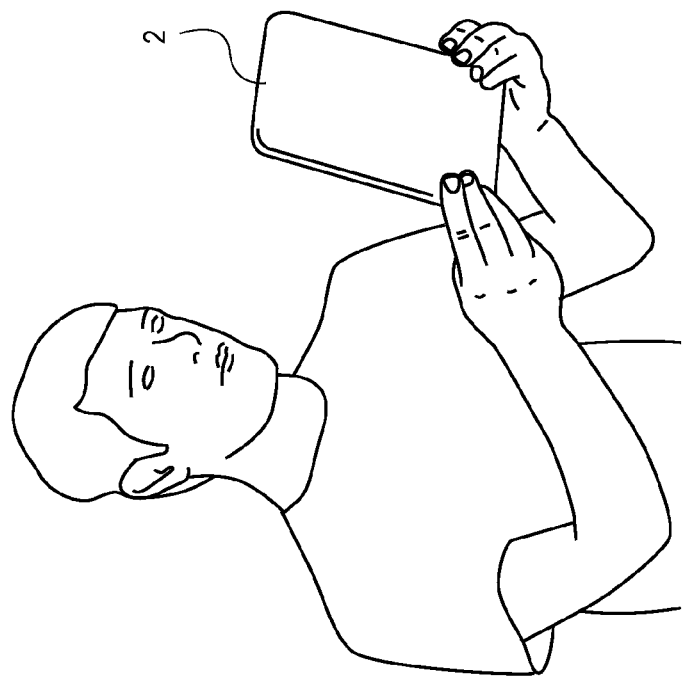
FIG. 1 shows a human user holding different types of multi-function mobile communications devices, namely a smart phone and a tablet-like personal computer.
Figure 1:
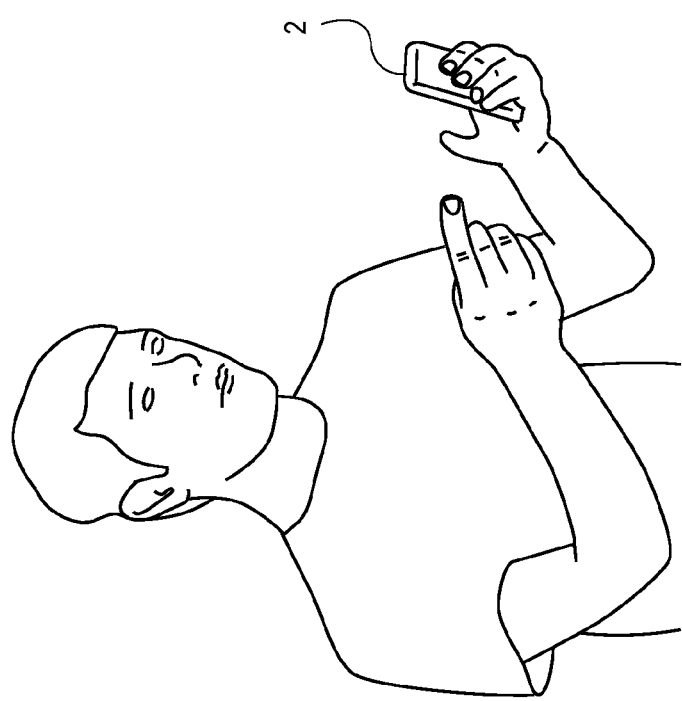

FIG. 1 shows two instances of a multi-function mobile communications device 2 (also referred to here as a mobile communications device) held in the hands of an end user (owner) of the device 2. In one instance, the device 2 is a smart phone or a cellular phone with several features typically available in modern wireless communication devices, such as a touch screen interface, music, video file recording, playback, digital camera, and wireless-enabled applications such as voice over internet protocol telephony, electronic calendar, web browser, and email. In another instance, the device 2 may be a larger, tablet-like computer such as an iPad™ device by Apple Inc.

Figure 2:
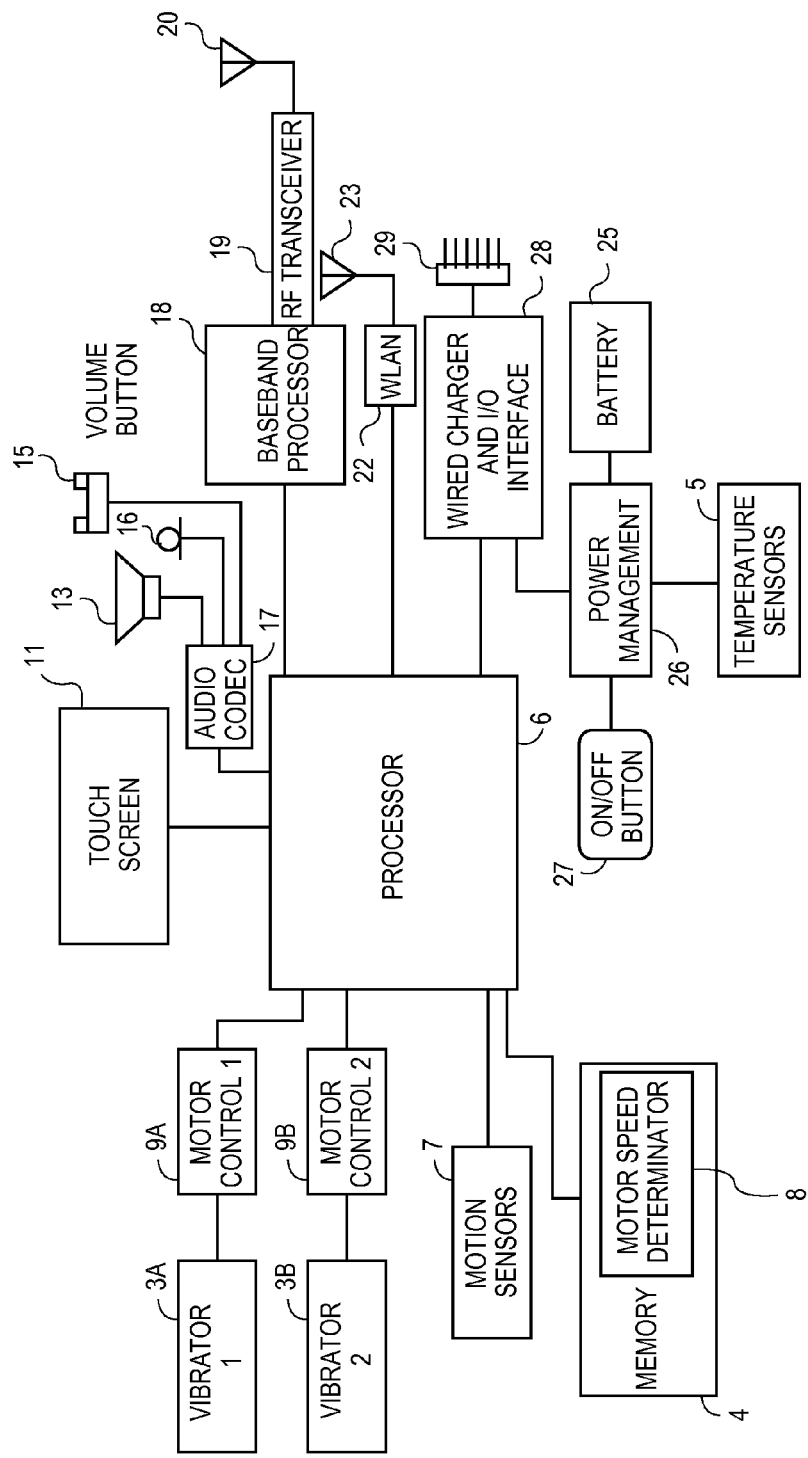
FIG. 2 is a block diagram of the constituent functional unit blocks and hardware components in an example multi-function mobile communications device.

FIG. 2 shows a functional unit block diagram and some constituent hardware components of the mobile communications device 2, e.g. as found in an iPhone™ device by Apple Inc. Although not shown, the device 2 has a housing in which the primary mechanism for visual and tactile interaction with its user is a touch sensitive display screen (referred to here as a touch screen) 11. The housing may be essentially a solid volume referred to as candy bar or chocolate bar type as in the iPhone device. An alternative is one that has a moveable, multi-piece housing, such as a clamshell design, or one with a sliding, physical keypad as used by other cellular and mobile handset or smart phone manufacturers. The touch screen 11 is used to display typical features of visual voicemail, web browser, email, and digital camera viewfinder, as well as others, and to receive input from the user via virtual buttons and touch commands.

For wireless telephony, which enables the user to receive and place audio and/or video calls, downlink audio during a call can be emitted from a speaker 13 (which may be an earpiece speaker or receiver, or it may be a headset earphone). Uplink audio includes the user's speech, which is picked up by a microphone 16 (e.g., mouthpiece microphone or headset microphone). Conversion between analog domain and digital domain for the speaker and microphone signals, in addition to digital audio signal processing for different applications running in the device 2, may be performed within audio codec 17. A physical volume switch or button 15 may also be connected to the codec. The codec 17 may be configured to operate in different modes, e.g. to service a digital media player function (such as an MP3 player that is playing back a music file that is stored in the device 2), as well as a wireless telephony function.

For wireless telephony, a baseband processor 18 is included to perform speech coding and decoding functions upon the uplink and downlink signals, respectively, in accordance with the specifications of a given protocol, e.g. cellular GSM, cellular CDMA, wireless VOIP. A cellular RF transceiver 19 receives the coded uplink signal from the baseband processor and up converts it to a carrier band before driving an antenna 20 with it; it receives a downlink signal from the antenna 20 and down converts the signal to baseband before passing it to the baseband processor 18. A wireless local area network transceiver 22 receives and transmits data packets from a nearby wireless router or access point, using an antenna 23.

Power is provided to operate the components shown in FIG. 2 by a battery 25 (generically used here to refer to a rechargeable power source that may also include a rechargeable fuel cell). The battery 25 is charged or replenished by an external power source such as a wall plug or automobile battery dc power adapter (not shown) that connects to a multi-pin docking connector 29 that is also integrated in the housing of the device 2. The connector 29 and its associated charger and I/O interface circuitry 28 may be in accordance with any suitable computer peripheral specification such as Universal Serial Bus (USB). The USB protocol allows for the connector 29 and its associated interface 28 to be used for both power transfer to recharge the battery 25 and for data I/O communications. The latter includes docking functions, to synchronize user content in the device 2 with another computer device owned by the user that may have substantially more data storage capacity, e.g. a desktop computer, a laptop/notebook computer.

The personal mobile communications device 2 may include a power management unit (PMU) 26. The PMU 26 is typically implemented as a programmed processor, with associated analog and digital conversion circuitry, analog signal conditioning circuitry, and a data communications interface needed to control or communicate with other components of the device 2 (for purposes of thermal management). The PMU 26 obtains temperature data (or temperature readings) from multiple temperature sensors 5, and then processes that data to make decisions that affect power consumption activity, in order to maintain specified thermal levels for the device 2. The PMU 26 may include power supply circuitry with various regulated voltage outputs for supplying power to the components of the device 2. The PMU 26 may also be tasked with the orderly powering down and powering up the various components of the device 2, in response to system reset or the main power on/off switch 27 being actuated by the user.

The device 2 also includes a motion sensor 7 which may use an accelerometer to measure linear acceleration of the device 2 along a given axis. Motion sensor 7 may use a MEMS type mechanical sensor or gyroscope to measure turn rate or angular velocity of the device 2 about a given axis. Motion sensor 7 may be integrated with the vibrators 3A and 3B on the same integrated circuit die or alternatively in the same integrated circuit package. Although described herein as containing two vibrators 3A and 3B, the device 2 may contain more than two vibrators.

The user-level functions of the device 2 are implemented under control of a processor 6 that has been programmed in accordance with instructions (code and data) stored in memory 4. The processor 6 and memory 4 are generically used here to refer to any suitable combination of programmable data processing components and data storage that conduct the operations needed to implement the various functions of the device 2. The processor 6 may be an applications processor typically found in a smart phone, while the memory 4 may refer to microelectronic, non-volatile random access memory. An operating system may be stored in the memory 4, along with application programs specific to the various functions of the device, which are to be run or executed by the processor 6 to perform the various functions of the device 2. For instance, there may be a telephony application that (when launched, unsuspended, or brought to foreground) enables the user to "dial" a telephone number to initiate a telephone call using a wireless VOIP or a cellular protocol and to "hang up" on the call when finished.

Referring again to FIG. 2, device 2 includes vibrators 3A and 3B, which are generally configured according to a fixed vibrator geometry including a motor body with a rotating counter-weight. Due to the generally reduced size of a vibrator motor, the vibrators 3A and 3B may exhibit speed tolerance (variation) of, for example, plus or minus 20 percent.

The vibrators 3A and 3B are driven by motor controls 9A and 9B, respectively. The motor controls 9A and 9B drive the vibrators 3A and 3B at designated voltages based on a motor speed determinator module 8. For example, the motor controls 9A and 9B may output a constant voltage in the range of +1.25V to +6.5V delivering up to 120 mA to the vibrators 3A and 3B, respectively. The output of the motor controls 9A and 9B to vibrators 3A and 3B provide a constant vibration to the device 2. Each of the motor controls 9A and 9B may output the same or different voltage levels to drive motor controls 9A and 9B independently.

As shown in FIG. 2, motion sensor 7 is communicably coupled to vibrators 3A and 3B. The motion sensor 7 of device 2, shown in FIG. 2, is generally provided for functions other than sampling detected vibration of vibrator 3A and 3B. As a result, motion sensor 7 is an available device within mobile communications device 2 that is available to detect general motion, movement, and acceleration of the device 2. The motion sensor 7 may be an accelerometer, a gyroscope, or an inclinometer. The motion sensor 7 may be variably programmed to detect and record motion at various sample rates. For example, the motion sensor 7 may operate at a 500 Hz sampling rate while the device 2 is in a normal mode. At a sampling rate of 500 Hz, 512 point measurements may be taken per second. In other modes (such as a test mode), the motion sensor 7 may operate at a 1 kHz sampling rate. At a sampling rate of 1 kHz, 1024 point measurements may be taken per second. As part of the sensor readout operation, a smoothing function may be applied to a short sequence of raw output values from the motion sensor 7 to obtain a single, representative value. For instance, the actual output data that is evaluated or used in a subsequent operation below may be an average of several samples taken from the motion sensor 7, so as to smooth out the effects of noise in instantaneous readings from the motion sensor 7, or to ensure that the raw values are reasonably stable before using them.

Still referring to FIG. 2, motor speed determinator module 8 determines a speed and rotational phase for each of the vibrators 3A and 3B as they are running. In one embodiment, the motor speed determinator module 8 is defined by control circuitry integrated in the mobile communications device 2. The control circuitry may include one or more of the processor 6, the memory 4, and a set of hardware logic structures (e.g. filters, arithmetic logic units, dedicated state machines, and Fast Fourier Transform processors).

Figure 3A:
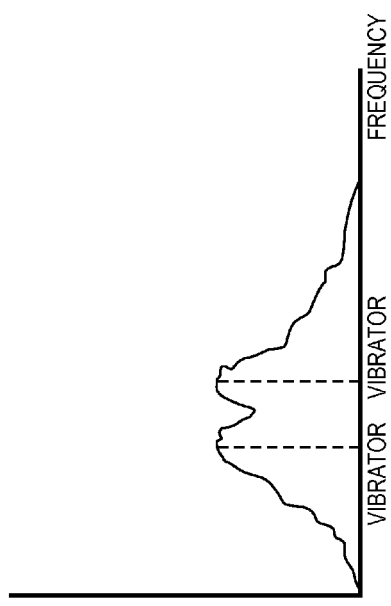
FIG. 3A-FIG. 3d are frequency domain representations of vibrations sensed in a mobile device, caused by two vibrators whose rotational speeds and rotational phases are slowly adapted to achieve a resonance-type effect.

In one embodiment, the motor speed determinator module 8 determines the speed and rotational phases of each vibrator 3A and 3B based on outputs of the motion sensor 7. For example, the motor speed determinator module 8 determines the speed and rotational phases of each vibrator 3A and 3B after receiving a predetermined number of point measurements from the motion sensor 7. A frequency transformation may be performed on the point measurements to determine an operating frequency and magnitude for each vibrator 3A and 3B. In one embodiment, the frequency transformation may be performed based on a magnitude/frequency graph, as shown in FIG. 3A. Representatively, the fast Fourier transformation (FFT) of the data is used to obtain a frequency spectrum of the vibration of the device 2. Representatively, the frequency spectrum may indicate a frequency F1 as well as subsequent harmonic values, such that the frequency F1 is determined as the frequency of the vibrator 3A. Similarly, the frequency spectrum may indicate a frequency F2 as well as subsequent harmonic values, such that the frequency F2 is determined as the frequency of the vibrator 3B. These frequency values F1 and F2 are represented by separate spectral peaks in the graph shown in FIG. 3A. Based on the determined frequency of each of the vibrators 3A and 3B, the revolution per minute (RPM) value may be determined as a rotational speed of each of the vibrators 3A and 3B. For example, multiplying the frequencies (F1 and F2) according to equations 1 and 2 produce rotational speeds for the vibrator motors 3A and 3B, respectively.

$$RPM_a = F1*60 \quad (1)$$

$$RPM_b = F2*60 \quad (2)$$

Although described with reference to frequency, a speed value may be assigned to the vibrators 3A and 3B based on a magnitude in the graph of FIG. 3A. As further described herein, a speed of the vibrators 3A and 3B may be, for example, a rotational speed such as the revolution per minute value. It should be noted, however, that the speed value of a vibrator motor may also include linear vibrators as well as the rotary vibrator described. In the example described, an accelerometer sampling at 1 kHz can complete the predetermined number 1024 point measurements within one second. Using the FFT on the data quickly determines a frequency of the vibrators 3A and 3B, which is used to calculate an RPM value.

The determined rotational speeds for the vibrator motors 3A and 3B may be different. If they are different, the motor speed determinator module 8 determines a unified rotational speed to drive the vibrators 3A and 3B. For example, the unified rotational speed may be the rotational speed of the faster vibrator motor. In this embodiment, if $RPM_a$ is 1000 revolutions per minute and $RPM_b$ is 900 revolutions per minute, the motor speed determinator module 8 sets the unified rotational speed to 1000 revolutions per minute.

Figure 3C:
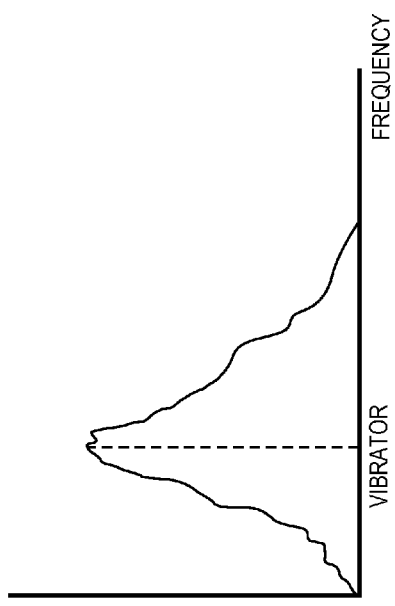
Figure 3B:
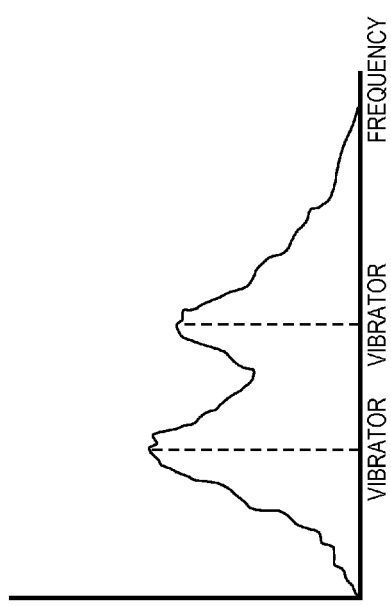

The motor speed determinator module 8 drives both vibrators 3A and 3B to the unified rotational speed. As shown in FIG. 3B, the magnitudes of peaks F1 and F2 corresponding to the vibrators 3A and 3B, respectively, are driven to be equal such that $RPM_a$ and $RPM_b$ are also equal. In one embodiment, the motor speed determinator module 8 sends the unified rotational speed to the motor controls 9A and 9B. The motor controls 9A and 9B drive the vibrators 3A and 3B at appropriate voltages such that each vibrator 3A and 3B achieves a rotational speed equal or nearly equal to the unified rotational speed.

In another embodiment, the motor speed determinator module 8 determines appropriate voltage settings for each vibrator 3A and 3B to drive each vibrator 3A and 3B at the unified rotational speed. These voltage settings are transmitted to respective motor controls 9A and 9B. In this control loop, the motion sensor 7 continues to record measurements that are analyzed by the motor speed determinator module 8 to determine the current rotational speed of each vibrator 3A and 3B. Based on these measurements provided by the motion sensor 7, the motor speed determinator module 8 can determine if the vibrators 3A and 3B are approaching the unified rotational speed. If readjustment is needed to ensure the unified rotational speed is reached, the motor speed determinator module 8 transmits adjusted settings to the motor controls 9A and 9B until the current rotational speed of each vibrator 3A and 3B is equal or nearly equal to the unified rotational speed. As shown in FIG. 3B, the magnitudes of both peaks corresponding to the vibrators 3A and 3B, respectively, are equal and have been driven to the unified rotational speed.

While driving each of the vibrators 3A and 3B to the same rotational speed as shown in FIG. 3B, the motor speed determinator module 8 monitors the phases of each vibrator 3A and 3B. Based on these monitored phased, the motor speed determinator module 8 determines a unified rotational phase to drive each of the vibrators 3A and 3B. The unified rotational phase is selected to maximize the vibration of the device 2. The unified rotational phase may be the current phase of one of the vibrators 3A and 3B. For example, the phase of vibrator 3A may be used as the unified rotational phase and the rotational phase of the vibrator motor 3B may be adjusted to equal that of the vibrator motor 3A. In another embodiment, a rotational phase in between the vibrators 3A and 3B is used as the unified rotational phase. In this embodiment, the speed of both vibrators 3A and 3B are adjusted to be driven at the unified rotational phase.

By monitoring the phase of the vibrators 3A and 3B along with their magnitudes in the frequency spectrum, the phase differences between the vibrators 3A and 3B may be adjusted to maximize vibrations. In one embodiment, vibrations are maximized when the relative phase difference between the vibrators 3A and 3B is adjusted to be equal to zero degrees or radians. In another embodiment, another predetermined range/difference between the phases of the vibrators that is expected to merge and maximize the individual magnitude peaks may be used. This phase difference may be pre-calculated in a laboratory, stored in the device at manufacture, and/or periodically updated through network transmission.

Upon determination of a unified rotational phase, the motor speed determinator module 8 transmits settings to each of the motor controls 9A and 9B. The settings may be individual voltage and current values or a set of delay values for driving each vibrator 3A and 3B to the unified rotational phase. In another embodiment, the settings transmitted to the motor controls 9A and 9B includes a phase value. In this embodiment, the motor controls 9A and 9B independently adjust voltage drive parameters to drive their respective vibrators 3A and 3B at the unified rotational phase.

Figure 3D:
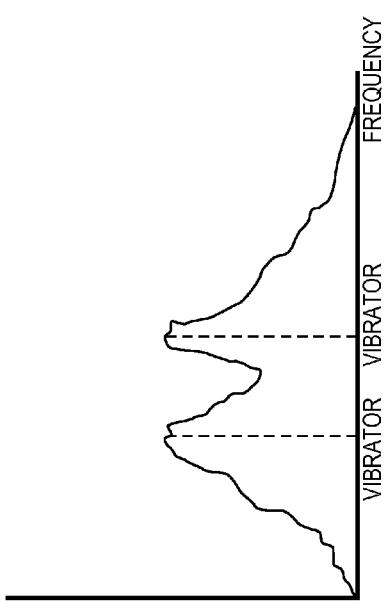

In one embodiment, the motor speed determinator module 8 may operate in a control loop to monitor the rotational phases of the vibrators 3A and 3B as adjustment occurs. In this loop, the motion sensor 7 continues to record measurements that are analyzed by the motor speed determinator module 8 to determine the current rotational phase of each vibrator 3A and 3B. Based on these measurements provided by the motion sensor 7, the motor speed determinator module 8 can determine if the vibrators 3A and 3B are approaching the unified rotational phase. If readjustment is needed to ensure the unified rotational phase is reached, the motor speed determinator module 8 transmits adjusted settings to the motor controls 9A and 9B. FIG. 3C shows the magnitude versus frequency graph of the vibrator motors 3A and 3B after partial adjustment has been performed. In FIG. 3C, the rotational phase of the vibrator 3B has been adjusted to approach the rotational phase of vibrator 3A, which is the unified rotational phase in this example. In FIG. 3D, the rotational phase of vibrators 3A and 3B are equal. This equality is represented by the overlapping of the frequency representations of the vibrators 3A and 3B in the frequency graph. As the frequencies and speeds of both vibrators 3A and 3B are now in sync, the resultant magnitude of their vibrations on the device 2 is also increased. This can be seen in FIG. 3D as a higher peak.

By adjusting the rotational phases of the vibrators 3A and 3B to be equal or near equal in response to constant readings by the motion sensor 7, the vibrations caused by each motor 3A and 3B do not cancel or dampen the vibrations of the other motor. Instead, the vibrations of each vibrator 3A and 3B combine to maximize the full vibration effects of the device 2 and the resultant vibrations felt by the user.

Figure 4:
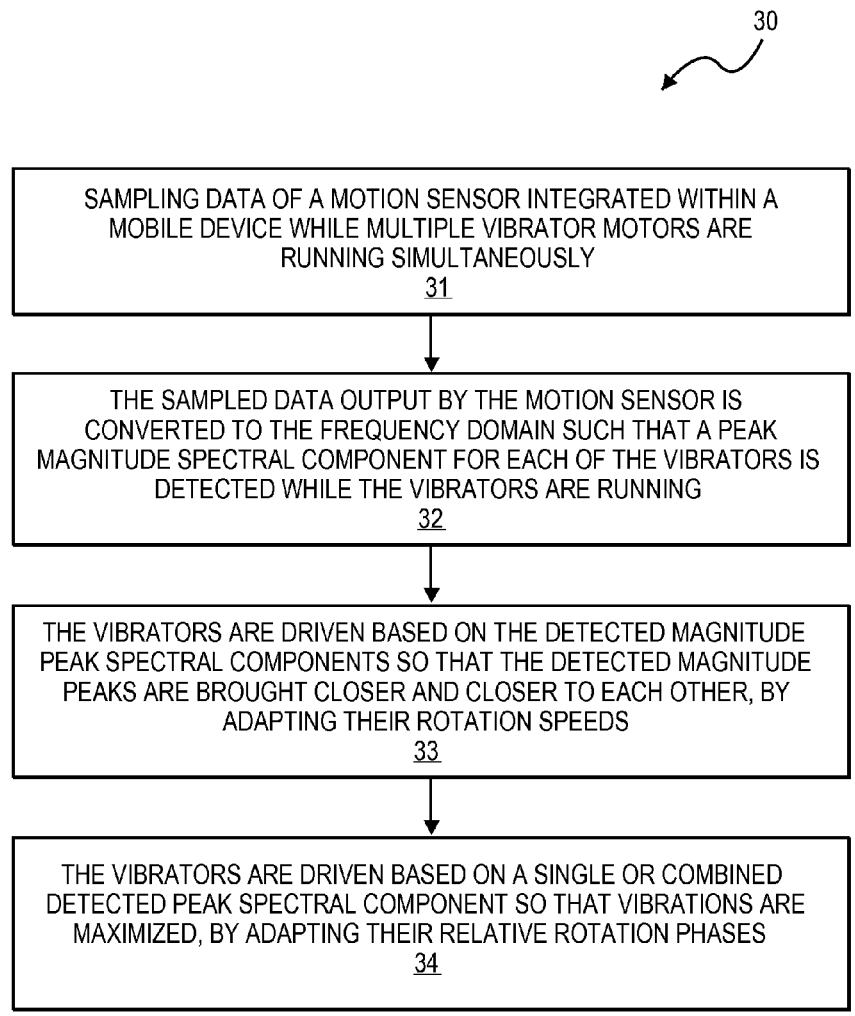
FIG. 4 is an algorithm or process flow for driving multiple vibrators in the mobile device.

Turning now to FIG. 4, a method for driving multiple vibrators 30 will be described. Each operation in the method 30 may be performed by one or more components described above and shown in FIG. 2. Although described herein as containing two vibrators 3A and 3B, the method 30 may be similarly applied to a device with more than two vibrators.

The method 30 begins at operation 31 by sampling data of a motion sensor integrated within a mobile device while multiple vibrator motors are running simultaneously. The sampling data includes data describing the motion and vibration of the mobile device over a period of time. In one embodiment, the motion sensor may be the motion sensor 7 and the multiple vibrators may be the vibrators 3A and 3B described above. In alternate embodiments, more than two vibrators may be used.

At operation 32, the sampled data output by the motion sensor is converted to the frequency domain such that a peak spectral component for each of the vibrators is detected while the vibrators are running. In one embodiment, the motion sensor data is converted to the frequency domain using a fast Fourier transform (FFT).

At operation 33, the vibrators are driven based on the detected peak spectral components, so that the detected peaks are brought closer and closer to each other, by adapting their rotational speeds. This may be performed by adjusting the voltage levels applied to each vibrator so that the magnitudes of each detected spectral peak corresponding to each vibrator are equal or nearly equal.

At operation 34, the vibrators are driven, based on the detected peak spectral components, so that the rotation phases of the vibrator motors are essentially equal. This may be performed by adjusting the voltage levels applied to each vibrator so that the spectral peaks corresponding to each vibrator are overlap.

By adjusting both the rotational speeds and phases of the vibrators to be equal or overlapping in response to constant readings by the motion sensor, the vibrations caused by each motor do not cancel or dampen the vibrations of the other motor. Thus, the full vibration effects of each vibrator are felt by a user, which thereby maximizes the vibration of the device.

The method 30 may be performed periodically during the lifetime and use of the device 2. For example, the method 30 may be performed each time the vibrators 3A and 3B are run and throughout the run of the vibrators 3A and 3B. This periodic and consistent performance of the method 30 ensures that the vibrators 3A and 3B are continually maximizing their effect.

As explained above, an embodiment of the invention may be a machine-readable medium (such as microelectronic memory) having stored thereon instructions, which program one or more data processing components (generically referred to here as a "processor") to perform the vibrator speed determination processing operations described above. In other embodiments, some of these operations might be performed by specific hardware components that contain hardwired logic (e.g., dedicated state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method within a mobile communications device, comprising:
    sampling output data of a motion sensor that is integrated in the mobile communications device while a first vibrator motor and a second vibrator motor are both running;
    converting the sampled output data to frequency domain and detecting frequency and magnitude of each of first and second peak spectral components;
    computing rotational speed for each of the first and second vibrator motors based on the detected frequencies of the first and second peak spectral components;
    driving the first and the second vibrator motors using feedback from the detection of the first and second peak spectral components so that the peak spectral components approach each other in frequency until the first and second peak spectral components have merged into a single peak spectral component; and then
    driving the first and the second vibrator motors using feedback from detection of the merged single peak spectral component so that magnitude of the merged single peak spectral component is increased.

2. The method of claim 1, wherein driving the first and second vibrator motors to make the first and second peak spectral components approach each other comprises changing drive voltage amplitude of one of the motors in response to detecting within the frequency domain that two peaks have merged into a single peak whose magnitude is increasing.

3. The method of claim 1, wherein computing the rotational speed comprises:
    determining a revolutions per minute value as the rotational speed for each of the first and second vibrator motors based on the frequencies of the detected first and second peak spectral components.

4. The method of claim 1, wherein converting the sampled output data to frequency domain comprises performing a fast Fourier transform.

5. The method of claim 1, further comprising determining a unified rotational speed to drive the vibrator motors, in response to the computed rotational speed being different, and sending the unified rotational speed, or a voltage representing the unified rotational speed, to motor control circuits that are driving the first and second vibrator motors, respectively.

6. The method of claim 1, further comprising:
    detecting the phase of each the first vibrator motor and the second vibrator motor; and
    driving the first and the second vibrator motors using feedback from the detected phases so that a phase difference between the first vibrator motor and the second vibrator motor approaches zero degrees.

7. A mobile communications device comprising:
    a mobile communications device housing;
    a first vibrator motor installed in the housing;
    a second vibrator motor installed in the housing;
    a motion sensor installed in the housing coupled to each of the first and the second vibrator motors; and
    control circuitry installed in the housing and coupled to the motion sensor, the control circuitry is to sample a data output signal of the motion sensor while the first and the second vibrator motors are running, the control circuitry to analyze the sampled data output signal to detect frequency and magnitude of the two highest peaks in a frequency spectrum, and compute a rotational speed for each of the first and vibrator motors based on the detected frequencies of the two highest peaks, and to adjust drive signals to the first and the second vibrator motors such that the two highest peaks merge into essentially one peak in the frequency spectrum and the magnitude of the merged peak is increased.

8. The mobile communications device of claim 7, wherein the motion sensor is an accelerometer.

9. The mobile communications device of claim 7, wherein the control circuitry comprises further circuitry for:
computing a predetermined number of vibrator motor resonance measurements, based on a predetermined sampling rate, using the motion sensor of the mobile communications device; and
performing a frequency transformation on the vibrator motor resonance measurements to obtain a frequency spectrum of the vibration for each of the first and second vibrator motors, wherein the vibration of each of the vibrators is represented by a peak in the frequency spectrum.

10. The mobile communications device of claim 7, wherein computing the rotational speed comprises:
determining a revolutions per minute value as the rotational speed for each of the first and second vibrator motors based on the frequency of the detected highest peaks.

11. The mobile communications device of claim 7, wherein the control circuitry is to compute rotational phase of each of the first and second vibrator motors based on the sampled data output signal, and determines a unified rotational phase, wherein one of the first and second vibrators is driven so that its rotational phase is adjusted to become the unified rotational phase.

12. The mobile communications device of claim 7, wherein the control circuitry comprises further circuitry for:
monitoring the phase of each the first vibrator motor and the second vibrator motor; and
driving the first and the second vibrator motors using feedback from the monitored phases so that the phases of the first vibrator motor and the second vibrator motor are synchronized.

13. A machine-readable storage medium that comprises stored instructions which, when executed by a processor in a mobile communications device,
read a motion sensor that is integrated within the mobile communications device to measure vibrations occurring at distinct frequencies;
convert the measured vibrations to frequency domain and detect therein a peak spectral component for each of first and second vibrator motors, while the motors are both running;
compute a predetermined number of vibrator motor resonance measurements, based on a predetermined sampling rate, using data read from the motion sensor of the mobile communications device;
adjust a drive signal of one of the first and second vibrator motors while continuing to measure the vibrations, to vary the rotational phase of the one of the motors until the peak spectral components are overlapping and form an overlapping peak spectral component; and
adjust a drive signal of one of the first and second vibrator motors while continuing to measure the vibrations until the magnitude of the overlapping peak spectral component has increased.

14. The machine-readable medium of claim 13, wherein the instructions program the processor to determine a unified rotational speed to drive the vibrator motors, and sending the unified rotational speed, or a voltage representing the unified rotational speed, to motor control circuits that are driving the first and second vibrator motors, respectively.

15. The machine-readable storage medium of claim 13, wherein the instructions program the processor:
to detect the phase of each the first vibrator motor and the second vibrator motor and
drive the first and the second vibrator motors using feedback from the detected phases so that a phase difference between the first vibrator motor and the second vibrator motor approaches zero degrees.

* * * * *